United States Patent
Brenneman et al.

(10) Patent No.: US 8,645,860 B2
(45) Date of Patent: Feb. 4, 2014

(54) AUTOMATIC DISPLAY OF RESIZED IMAGES

(75) Inventors: Shawn Brenneman, Mountain View, CA (US); Michael Herf, Los Angeles, CA (US); Robert Bailey, San Francisco, CA (US); Aaron Hopkins, Hawthorne, CA (US)

(73) Assignee: Google Inc., Mountain View, CA (US)

( * ) Notice: Subject to any disclaimer, the term of this patent is extended or adjusted under 35 U.S.C. 154(b) by 439 days.

(21) Appl. No.: 11/724,600

(22) Filed: Mar. 15, 2007

(65) Prior Publication Data

US 2007/0283247 A1     Dec. 6, 2007

Related U.S. Application Data

(60) Provisional application No. 60/782,920, filed on Mar. 15, 2006.

(51) Int. Cl.
*G06F 3/00* (2006.01)

(52) U.S. Cl.
USPC .......................................... 715/800; 715/801

(58) Field of Classification Search
USPC .................................................. 715/800–801
See application file for complete search history.

(56) References Cited

U.S. PATENT DOCUMENTS

| | | | | |
|---|---|---|---|---|
| 5,764,235 | A * | 6/1998 | Hunt et al. | 345/428 |
| 5,960,126 | A * | 9/1999 | Nielsen et al. | 382/298 |
| 6,310,601 | B1 * | 10/2001 | Moore et al. | 345/660 |
| 6,456,305 | B1 * | 9/2002 | Qureshi et al. | 715/800 |
| 7,222,306 | B2 * | 5/2007 | Kaasila et al. | 715/801 |
| 7,257,776 | B2 * | 8/2007 | Bailey et al. | 715/788 |
| 7,451,405 | B2 * | 11/2008 | Sylthe et al. | 715/800 |
| 7,511,723 | B2 * | 3/2009 | Sylthe et al. | 345/671 |
| 2003/0095135 | A1 * | 5/2003 | Kaasila et al. | 345/613 |
| 2005/0116966 | A1 * | 6/2005 | Graham et al. | 345/661 |
| 2006/0015820 | A1 * | 1/2006 | Wood | 715/788 |
| 2006/0031760 | A1 | 2/2006 | Jacobs | |
| 2007/0174489 | A1 * | 7/2007 | Iwabuchi | 709/246 |
| 2008/0177994 | A1 * | 7/2008 | Mayer | 713/2 |

FOREIGN PATENT DOCUMENTS

| | | |
|---|---|---|
| EP | 1 391 825 | 2/2004 |
| JP | 6149523 A | 5/1994 |
| JP | 2000122956 A | 4/2000 |
| JP | 2001318853 A | 11/2001 |
| JP | 2002049558 A | 2/2002 |
| JP | 2004013297 A | 1/2004 |
| JP | 2006048706 A | 2/2006 |

OTHER PUBLICATIONS

Notice of Reasons for Rejection (including translation) in Application No. 2009-500461, mailed Sep. 27, 2011, 5 pages.

* cited by examiner

*Primary Examiner* — Ryan Pitaro
(74) *Attorney, Agent, or Firm* — IP Spring

(57) ABSTRACT

Systems and methods for automatic display of scaled and/or resized images that fit within pre-defined areas in a web browser are disclosed. The method may be implemented using an image scaling JavaScript component embedded within a HTML document. Upon resizing the a client document browser in which the document is displayed, the component is resized and requests, receives and redisplays a resized image within the resized component from a server. By having the server perform the resizing, the resized image not only fits within the resized component but also maintains the quality of the image without the need for special client-side software.

24 Claims, 4 Drawing Sheets

AUTOMATIC DISPLAY OF RESIZED IMAGES

This application claims the benefit of U.S. Provisional Application No. 60/782,920, filed Mar. 15, 2006, which is hereby incorporated by reference.

BACKGROUND OF THE INVENTION

1. Field of the Invention

The present invention relates generally to scaling and/or resizing of images for display over a network. More specifically, systems and methods for automatic display of scaled and/or resized images that fit within pre-defined areas in a web browser are disclosed.

2. Description of Related Art

Web browsers are frequently used to display images stored on backend servers and transmitted over the Internet or other network. By default, web browsers generally display fixed-sized images. However, display of fixed-sized images is often undesirable. For example, on high resolution displays, images may appear small and may not take full advantage of the available space in the web browser window. As another example, in small web browser windows, large images may not fit within the viewable space of the browser window, requiring the end user to scroll in order to view the entire image.

Although web browsers generally display fixed-sized images by default, a request may be made by the webpage to the web browser to resize an image to a size depending on the size of the browser. However, the quality of the image resized by the web browser is often low, resulting in blocky poor quality images. In addition, because the web browser makes a single image transfer request from the backend server for each image, the largest possible image is transmitted to the web browser, regardless of the size of the image to be displayed within the browser. Where the image display area within the browser is small, the image is resized and extra data will be unnecessarily transferred, thereby introducing delay.

Thus, it would be desirable to provide systems and methods for automatic scaling and/or resizing of images to fit within a pre-defined area in a web browser. Ideally, such systems and methods result in high quality resizing of image and would not require special client-side software to be installed.

SUMMARY OF THE INVENTION

Systems and methods for automatic display of scaled and/or resized images that fit within pre-defined areas in a web browser are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

The method, on a client side, for automatic display of resized images across a network generally include requesting a document, e.g., an HTML document, having a reference to an image from a server, displaying the document in a client document browser, e.g., a web page browser, displaying the image in the client document browser, automatically requesting a rescaled or resized image from the server upon resizing of the client document browser, receiving and displaying the rescaled or resized image received from the server in the client document browser.

On a server side, the method for automatic display of a resized image in a document across a network generally includes providing the document containing instructions for a client document browser to display the image within a component in the document, to rescale the component upon resizing of the client document browser, and to request a rescaled version of the image upon resizing of the client document browser, serving the document in response to a request for the document from the client document browser, and serving the image of a size specified by the client document browser to the client document browser.

The system for automatic display of a resized image in a document across a network may be implemented as a computer program product for use in conjunction with a computer system, the computer program product comprising a computer readable storage medium on which are stored instructions executable on a computer processor.

These and other features and advantages of the present invention will be presented in more detail in the following detailed description and the accompanying figures which illustrate by way of example principles of the invention.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Systems and methods for automatic display of scaled and/or resized images that fit within pre-defined areas in a web browser are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

The systems and methods described herein may be used in various applications for efficient rendering of a web page in a web browser. The systems and methods described herein generally works with standard web browsers such as Internet Explorer, Netscape Navigator, and Mozilla Firefox, without requiring special software be installed on the client side. In particular, the rescaling and/or resizing of images as described herein generally does not require special software to be installed on the client side and generally utilizes JavaScript. Although JavaScript is presented herein as illustrative methods for resizing images in browser windows, any other suitable methods may be similarly employed.

Figure 1:
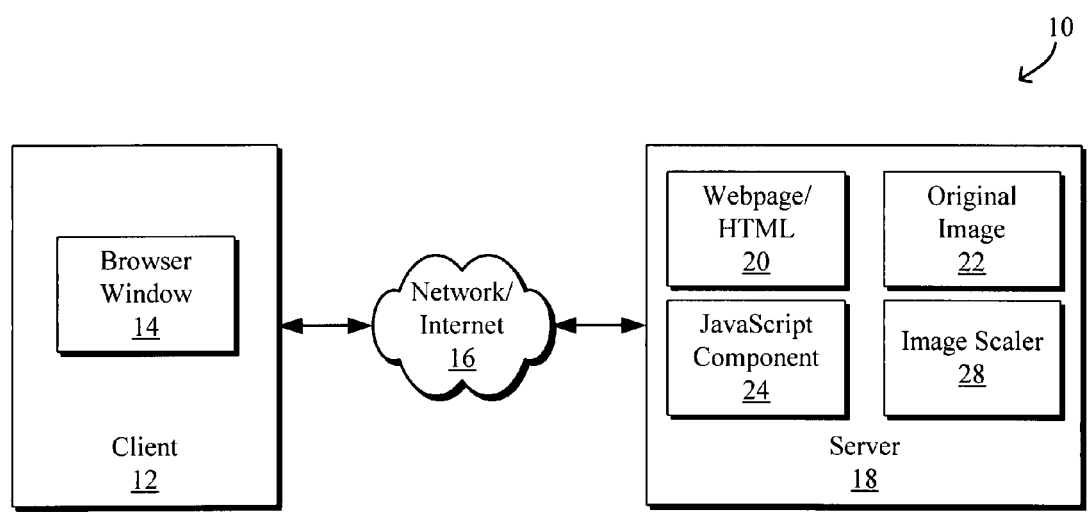
FIG. 1 illustrates an exemplary system architecture and process for automatically displaying resized or rescaled images that fit within pre-defined areas in a web browser.

FIG. 1 illustrates an exemplary system architecture and process 10 for automatically displaying rescaled images in a web browser. The system enables a browser to deliver resized images to an end user, based on the user's viewing environment. As shown, a browser window 14 is open on a client device 12, such as a personal computer. The browser 14 may be, for example, a web browser, that communications with a server 18 via a network 16 such as the Internet. The server 18 typically stores a webpage 20, typically in HTML, one or more original image(s) 22 referenced by the webpage 20, an image scaling JavaScript component 24, and an image scaler 28 that can scale the original images 22 to specified sizes. Although represented as a single block, the server 18 may store data on one or across multiple servers, e.g., computers. For purposes of clarity, the server 18 is described herein as generally serving one webpage that contains one image although the server 18 may serve numerous webpages each containing one or multiple images.

Figure 2:
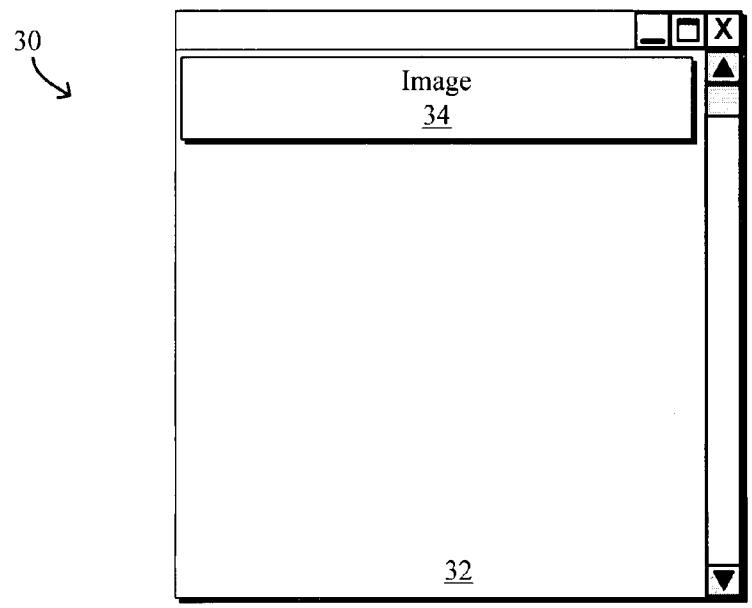
FIG. 2 illustrates an exemplary browser window displaying a webpage containing an image.
Figure 3:
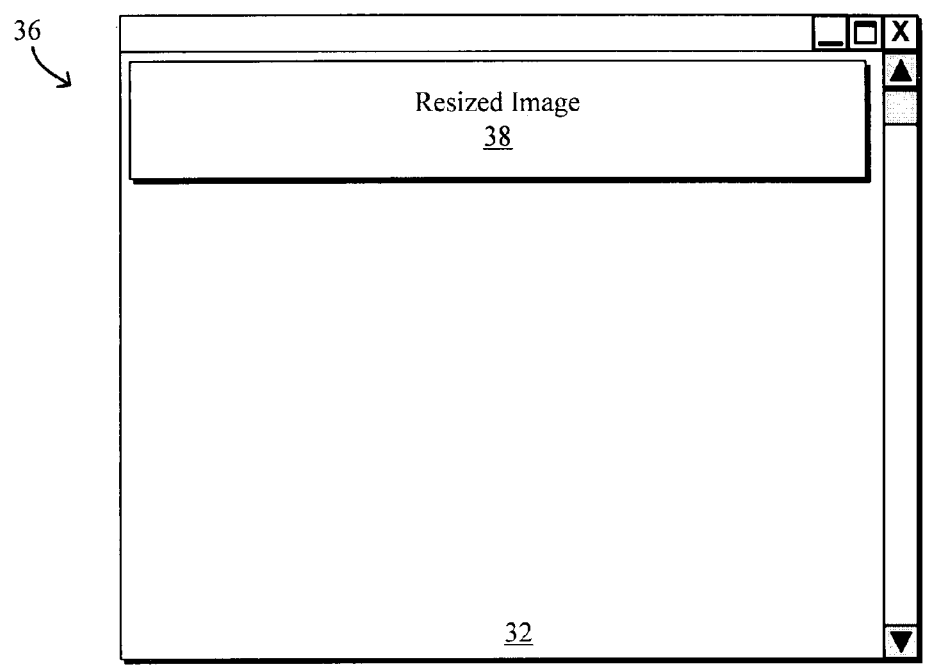
FIG. 3 illustrates an exemplary resizing of the browser window displaying the webpage of FIG. 2, the image being proportionately resized.

The functions of the systems and methods for automatic scaling and/or resizing of images for display in a web browser will now be described in more detail with reference to FIGS. 2 and 3. In particular, FIG. 2 illustrates an exemplary browser window 30 displaying a webpage 32 containing an image 34. As shown in the illustrative webpage 32, the image 34 generally occupies the width of the browser window 30. Upon resizing of the browser window 30, the systems and methods described herein automatically displays a resized or resealed image within the browser window. For example, as shown in FIG. 3, the resized browser window 36 displaying the webpage 32 is wider than that shown in FIG. 2. The image 38 displayed is proportionately resized within the resized browser window 36. In the example shown, the image 38 is resized to similarly occupy the width of the resized browser window 36. Although the above-described example illustrates an automatic resizing or rescaling that enlarges the image, the automatic resizing or rescaling of the image can be similarly applied to decrease the size of the image.

When the webpage initially loads in the browser window and/or when the browser window is resized, the image may be displayed using a JavaScript component. Generally, the JavaScript component can be embedded in a typical webpage and sized according to a fixed or relative size. A fixed size may be specified in terms of a fixed number of pixels. A relative size may be specified relative to the size of the browser window, e.g., image width equal to ½ the width of the browser window.

Once the JavaScript component determines the size of the image to be displayed, the JavaScript component makes a request to the backend server for an image scaled to fit within the available area of the component. When the server receives the request, the server may scale the image as requested using any suitable image scaling method. When the server responds with the appropriately scaled image, the browser window displays the scaled image in the JavaScript image component. Because the JavaScript component specifies the exact size to the backend server, the scaled image should fit within the available area of the JavaScript component.

Figure 4:
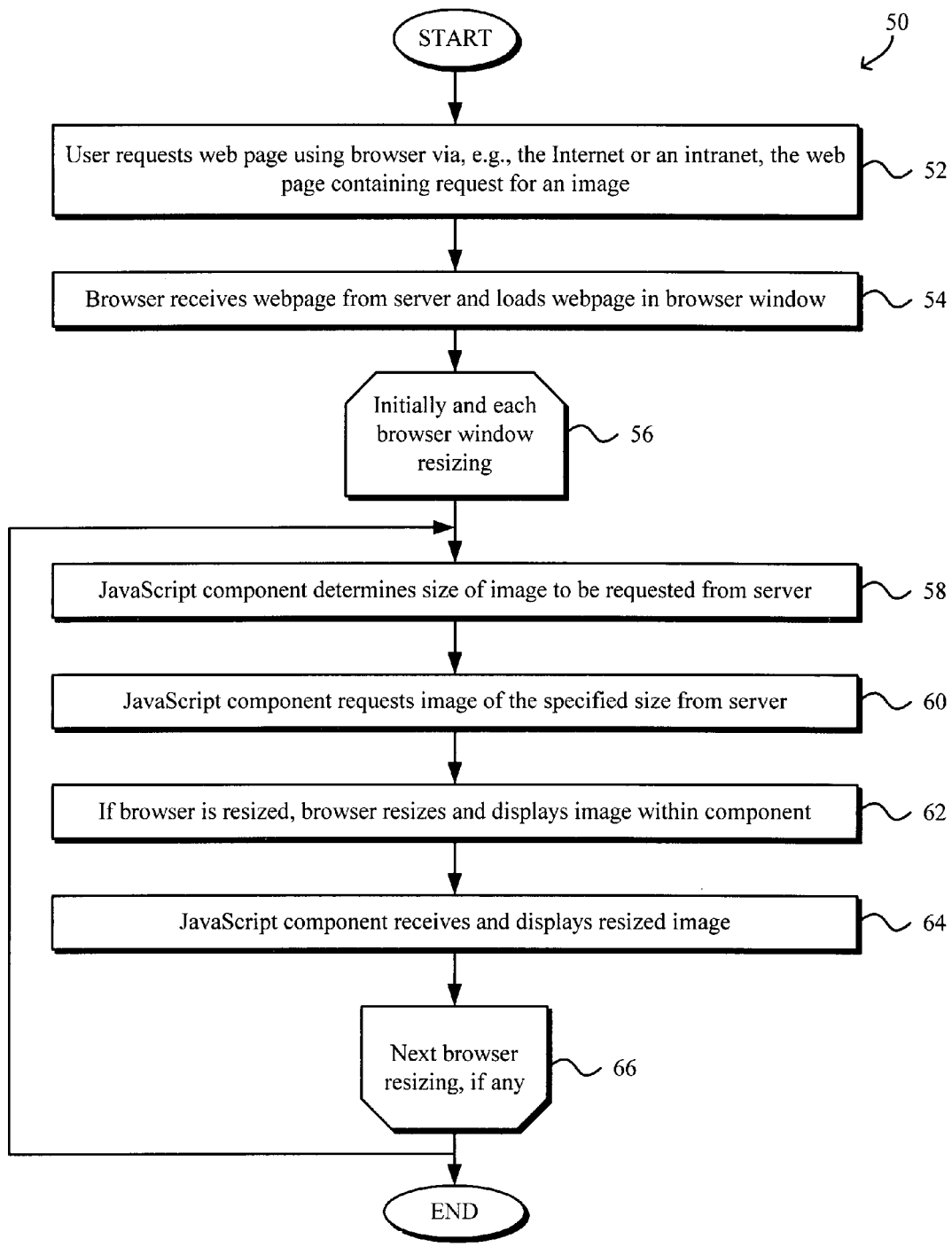
FIG. 4 is a flowchart of an exemplary client-side process for automatically displaying a resized image in a webpage upon resizing of a browser window.

The processes for the client-side and the server-side are described in more detail below with reference to FIGS. 4 and 5, respectively. In particular, FIG. 4 is a flowchart of an exemplary client-side process 50 for automatically displaying a resized image in a webpage upon resizing of a browser window. Specifically, a JavaScript component may be used to display images within a webpage.

At block 52, a user may request a web page using a browser via, e.g., the Internet or an intranet, where the web page contains at least one request for an image. At block 54, the browser receives and loads the web page, e.g., the HTML source code, from the server. In addition, the browser may also create the JavaScript component within the webpage at block 54.

To initially display the image and each time the image is resized due to, for example, browser window resizing at block 56, blocks 58, 60, 62, and 64 may be performed. At block 58, the JavaScript inside the component determines the size of the component and thus the size of the image to be requested from the backend server. In particular, the JavaScript awaits for and traps JavaScript resize events fired or sent by the browser. It is noted that when the component is initially created within the webpage, e.g., when the webpage initially loads in the browser window at block 54, the size of the component may generally be known. However, depending on the layout of the page, the size of the image component may not be known prior to the image component being created within the webpage.

The size of the image may be detecting based on a DIV (or browser window size or similar element in the browser). To request an image, the size may be transmitted to the server asynchronously. On handheld devices (where the browser typically occupies the entire screen), the request may instead include the display resolution. Alternatively or additionally, the display resolution may be determined from the browser identification string. In one example, the browser transmits a width and height to the server and the server, in response, serves the appropriately sized image.

At block 60, the JavaScript within the component transmits a request to the backend server for an image of the size that fits within the component, e.g., as determined in block 58. For example, if the component is 668 by 306 pixels, the JavaScript transmits a request to the backend server for an image that fits within the area of the component. In other words, when the browser window is resized, the JavaScript may transmit a request for a newly resized image from the backend server based on the new size of the component.

At block 62, after the image has been initially loaded and displayed, the webpage may optionally request the browser to resize and redisplay the image within the component upon browser resizing. In particular, while the component waits for the request for the newly resized image to be fulfilled by the backend server, the browser may temporarily display a rescaled image by rescaling the existing (already received on the end user/client side) image to fit within the new component size to give the end user a more immediate response. However, because this resizing is performed by the web browser, the quality of the rescaled image is typically lower than that provided by the server. Once the rescaled image from the server is received by the component, the image from the server replaces the temporary image at block 64. It is noted that although block 62 is shown to be performed after block 60 in the illustrative flowchart of FIG. 4, block 62 may be performed prior to block 60 is performed.

At block 64, when the browser receives the requested image from the backend server, the browser replaces the temporary image displayed at block 62 with the rescaled image received from the server. Because the resized image is scaled to fit within the area of the component, it would generally occupy the entire area. It is noted that if the backend server fails to respond to the request made by the JavaScript at block 62, the webpage may continue to display the temporary image rescaled by the browser at block 62. Each time the browser window is resized at block 66, the process 50 returns to perform blocks 58, 60, 62, and 64.

Figure 5:
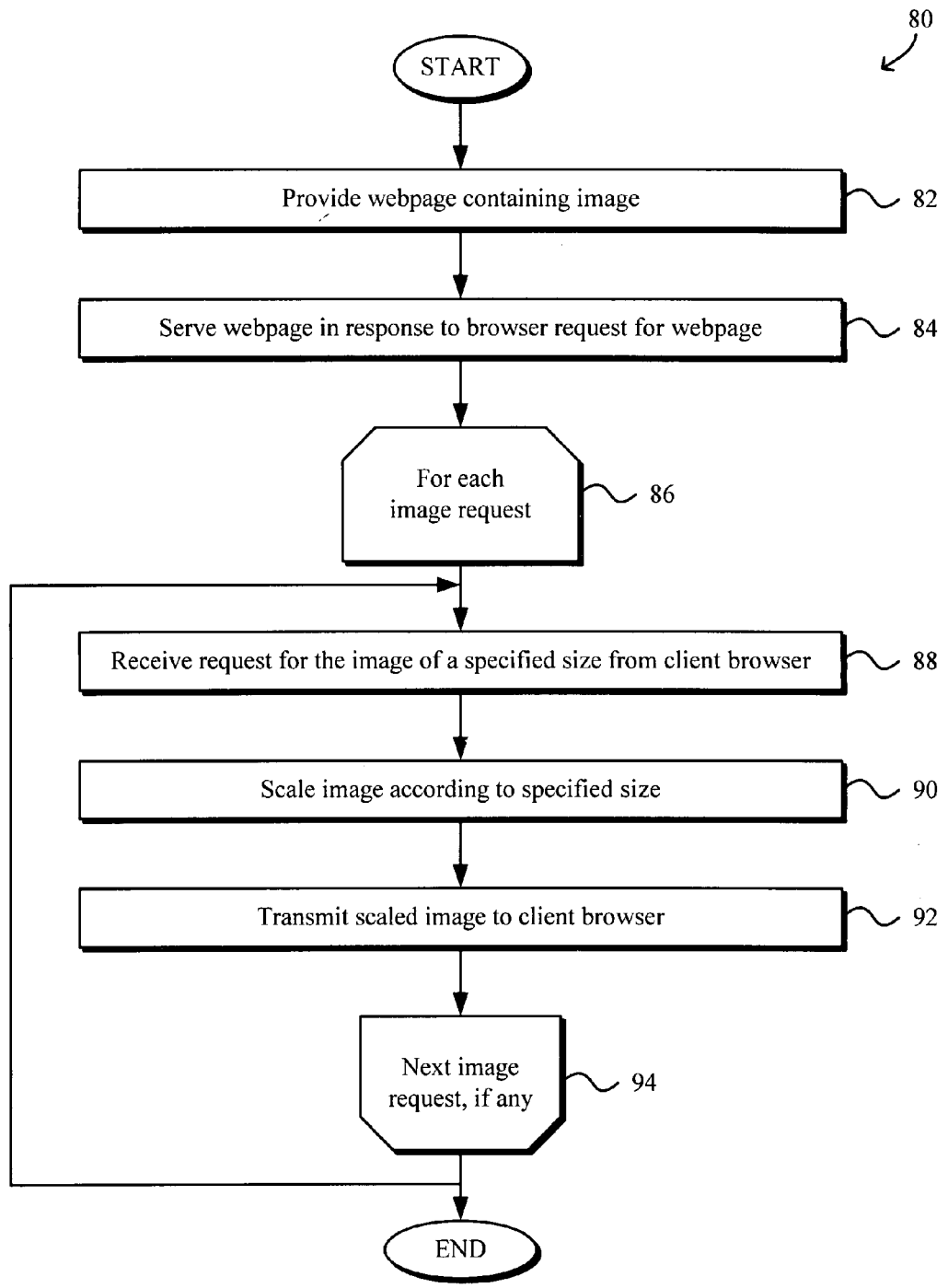
FIG. 5 is a flowchart of an exemplary server-side process to enable a client-side browser to automatically display a resized image in a webpage upon resizing of a browser window.

FIG. 5 is a flowchart of an exemplary server-side process 80 to enable a client-side browser to automatically display a resized image in a webpage upon resizing a browser window. At block 82, the server provides a webpage, typically in HTML, that contains at least one image. At block 84, the server serves the webpage in response to a browser request for the webpage. For each request for the image, e.g., initially or upon resizing of the browser, at block 86, blocks 88 and 90 are performed. At block 88, the server receives a request for the image of a specified size from client browser. At block 90, the server scales the image contained in the webpage according to the size requested by the client browser. The server may compute the scaled image on the fly or may retrieve the image from a set of precomputed sizes. At block 92, the server responds to the request by transmitting the scaled image to the client browser. Each time the server receives an image request, if any, at block 94, the process 80 returns to perform blocks 88, 90, and 92.

Typically, the server will have stored thereon an image of a larger size than those requested by various client browsers such that the server will resize or rescale an existing larger version of the requested image to a smaller version of the requested image to fulfill such requests. However, it is to be understood that the server may also resize an existing smaller image to a larger version in response to client browser requests. Further, the server may also store multiple versions of the same image in various sizes for more efficient and thus faster scaling and lower computational costs.

In requesting the scale image from the server, a smaller object namespace may be employed to improve the ability to cache images both on the server and on the client. For example, in one illustrative implementation, a request called "GetImage?width=640&height=480" may retrieve the same image as "GetImage?width=640&height=490". However, a simple caching server may not notice this and an intermediate proxy or a browser cache also may not notice this. Thus in another illustrative implementation, the request may reduce the number of parameters transmitted to the server and thus transmit only one parameter to the server. As an example, the request to the server may specify the maximum size, e.g., the longest edge, for the requested image.

The JavaScript transmitted by the server may be configured to perform simple computations on the client. The server may also transmit the width and height of the original, e.g., largest available, image to the client. Alternatively, the aspect ratio of the image may be provided as a floating point number by the server although such an implementation may not be as general as transmitting the original size of the image.

The JavaScript performs a proportional resize based on the width and height of the original image. As a result, the client may make a request to the server with only one parameter. As noted above, a request with in single parameter may help improve caching. In addition, upsampling may be allowed or not. Specifically, the image may be clamped to its original dimensions or stretched to fill the size in the browser, at the client's option. Proxies may be shown by using a smaller version of the same image to preview a larger image. This feature is enabled by determining the resulting image size prior to requesting the image and allowing the server to have knowledge of which image corresponds to which resolutions on the client. Further, zoom may be implemented to allow a cropped view of a large image, e.g., using a proxy while the image is loading and pan around within a viewport.

In some cases, it may be desirable to limit the quantity of unique images that a client can request from the server. One method to impose such a limit may be to include certain predetermined rules with the JavaScript code such that no roundtrip is required for a client to make valid requests to a server. Examples of such rules include a list of valid sizes and/or math to compute valid sizes. For example, one rule may specify that the client may only request images whose longest edge is of a length (in pixels) that is a multiple of 16. As another example, a list of precomputed sizes might be additionally or alternatively provided.

While the exemplary embodiments of the present invention are described and illustrated herein, it will be appreciated that they are merely illustrative and that modifications can be made to these embodiments without departing from the spirit and scope of the invention. For example, the systems and methods described herein are preferably implemented without requiring special software be installed on the client side, as generally described in the illustrative examples presented. As one alternative, the systems and methods may be implemented as a web browser plug-in, for example. However, such alternative methodologies require the user to install special client software. Thus, the scope of the invention is intended to be defined only in terms of the following claims as may be amended, with each claim being expressly incorporated into this Description of Specific Embodiments as an embodiment of the invention.

What is claimed is:

1. A method for automatic resizing of an image in a document for display across a network, comprising:
   serving, to a client computing device, the document, the document containing instructions for a client document browser, executed on the client computing device, to (a) display the image in a component within the client document browser, the component being embedded in the document, being sized relative to a size of the client document browser, and being configured to await for and trap resize events fired by the client document browser in response to resizing of the client document browser, and, in response to trapping a resize event fired by the client document browser, (b) resize the component and the image to provide a temporary, resized image that is temporarily displayed within the component, (c) determine a size of the component resulting from the resize event fired by the client document browser, (d) determine a size of a resized image based on the size of the component, (e) transmit a request for the resized image, the request specifying only one parameter corresponding to the size of the resized image, and (f) replace the temporary, resized image within the component with the resized image when received; and
   receiving the request and, in response:
   scaling a stored image at a server based on the only one parameter specified in the request to generate the resized image, the stored image corresponding to the image; and
   serving, to the client computing device, the resized image in response to the request for the resized image from the client document browser.

2. The method of claim 1, wherein the component is a JavaScript component.

3. The method of claim 1, wherein the only one parameter is selected from the group consisting of a length, a width, and a resolution.

4. The method of claim 1, wherein the instructions to resize the component and to request the resized image upon trapping the resize event fired by the client document browser are contained in the component.

5. The method of claim 1, wherein the only one parameter is a maximum size of a longest edge of the component.

6. The method of claim 1, wherein scaling the stored image at the server based on the only one parameter specified in the request to generate the resized image is performed further based on a predetermined set of rules defining math for computing valid sizes for the resized image.

7. The method of claim 1, wherein scaling the stored image at the server based on the only one parameter specified in the request to generate the resized image is performed further based on a set of predetermined valid sizes for the resized image.

8. A method for automatic resizing and display of an image in a document received across a network, comprising:
- requesting and receiving, at a client computing device, the document and image by a client document browser from a server across the network, the client computing device executing the client document browser, the document containing a reference to the image on the server;
- displaying the document in the client document browser;
- displaying the image in a component within the client document browser, the component being embedded within the document, being sized relative to a size of the client document browser, and being configured to await for and trap resize events fired by the client document browser in response to resizing of the client document browser; and
- in response to trapping a resize event fired by the client document browser:
  - resizing the component and the image to provide a temporary, resized image;
  - displaying the temporary, resized image within the component;
  - determining a size of the component resulting from the resize event fired by the client document browser;
  - determining a size of a resized image based on the size of the component; and
  - transmitting a request for the resized image to the server, the request specifying only one parameter corresponding to the size of the resized image; and
- receiving, and displaying the resized image from the server, the resized image having been generated at the server by scaling a stored image based on the only one parameter specified in the request, the stored image corresponding to the image, and the resized image replacing the temporary, resized image within the component.

9. The method of claim 8, wherein when the component is initially created within the document, the component requests, receives and displays image sized according to the size of the component from the server.

10. The method of claim 8, wherein the component is a JavaScript component.

11. The method of claim 8, wherein the only one parameter is selected from the group consisting of a length, a width, and a resolution.

12. The method of claim 8, wherein the instructions to resize the component and to request the resized image of upon trapping the resize event fired by the client document browser are contained in the component.

13. The method of claim 8, wherein the only one parameter is a maximum size of a longest edge of the component.

14. The method of claim 8, wherein generating the resized image at the server by scaling a stored image based on the only one parameter specified in the request is performed further based on a predetermined set of rules defining math for computing valid sizes for the resized image.

15. The method of claim 8, wherein generating the resized image at the server by scaling a stored image based on the only one parameter specified in the request is performed further based on a set of predetermined valid sizes for the resized image.

16. A system for automatic resizing of an image in a document for display across a network, comprising:
- storage for storing a document that can be served to a client computing device and an image referenced by the document, the component being embedded within the document, being sized relative to a size of a client document browser that is executed on the client computing device, and being configured to await for and trap resize events fired by the client document browser in response to resizing of the client document browser, the component containing instructions for the client document browser to, in response to trapping of a resize event fired by the client document browser: resize the component and the image to provide a temporary, resized image, temporarily display the temporary, resized image within the component, determine a size of the component resulting from the resize event fired by the client document browser, determine a size of a resized image based on the size of the component, and transmit a request for the resized image, the request specifying only one parameter corresponding to the size of the resized image;
- an image scalar based on the only one parameter specified in the request and configured to generate the resized image in response to the request for the resized image, the image being scaled at a server using the image scalar to generate the resized image; and
- a network interface configured to receive requests for the document and for resized images and to serve the document, the component, and resized images.

17. The system of claim 16, wherein the storage is further configured to store at least one of the resized images.

18. The system of claim 16, wherein the only one parameter is a maximum size of a longest edge of the component.

19. The system of claim 16, wherein the resized image is generated at the server further based on a predetermined set of rules defining math for computing valid sizes for the resized image.

20. The system of claim 16, wherein the resized image is generated at the server further based on a set of predetermined valid sizes for the resized image.

21. A computer-implemented method, comprising:
- receiving, at a server including one or more processors, a first request for a web page from a computing device via a network, the web page including a component configured to (i) display an image and (ii) await and trap resize events fired by a web browser executing on the computing device in response to resizing of the web browser;
- transmitting, from the server, the web page to the computing device via the network in response to receiving the first request;
- receiving, at the server, (i) a second request for a resized image and (ii) one parameter for obtaining the resized image, from the computing device via the network, the second request being generated at the computing device in response to the component trapping a resize event fired by the web browser;
- obtaining, at the server, the resized image using the one parameter in response to receiving the second request; and transmitting, from the server, the resized image to the computing device via the network, wherein upon receiving the resized image the computing device replaces a temporary resized image displayed by the component with the resized image, the temporary resized image having been generated at the computing device in response to the component trapping the resize event fired by the web browser.

22. The computer-implemented method of claim 21, wherein obtaining the resized image further includes using a predetermined set of rules defining math for computing valid sizes for the resized image.

23. The computer-implemented method of claim 21, wherein obtaining the resized image further includes using a set of predetermined valid sizes for the resized image.

24. The computer-implemented method of claim 21, wherein the one parameter for obtaining the resize image is a maximum length of a longest edge of the component.

* * * * *